United States Patent Office 3,677,848

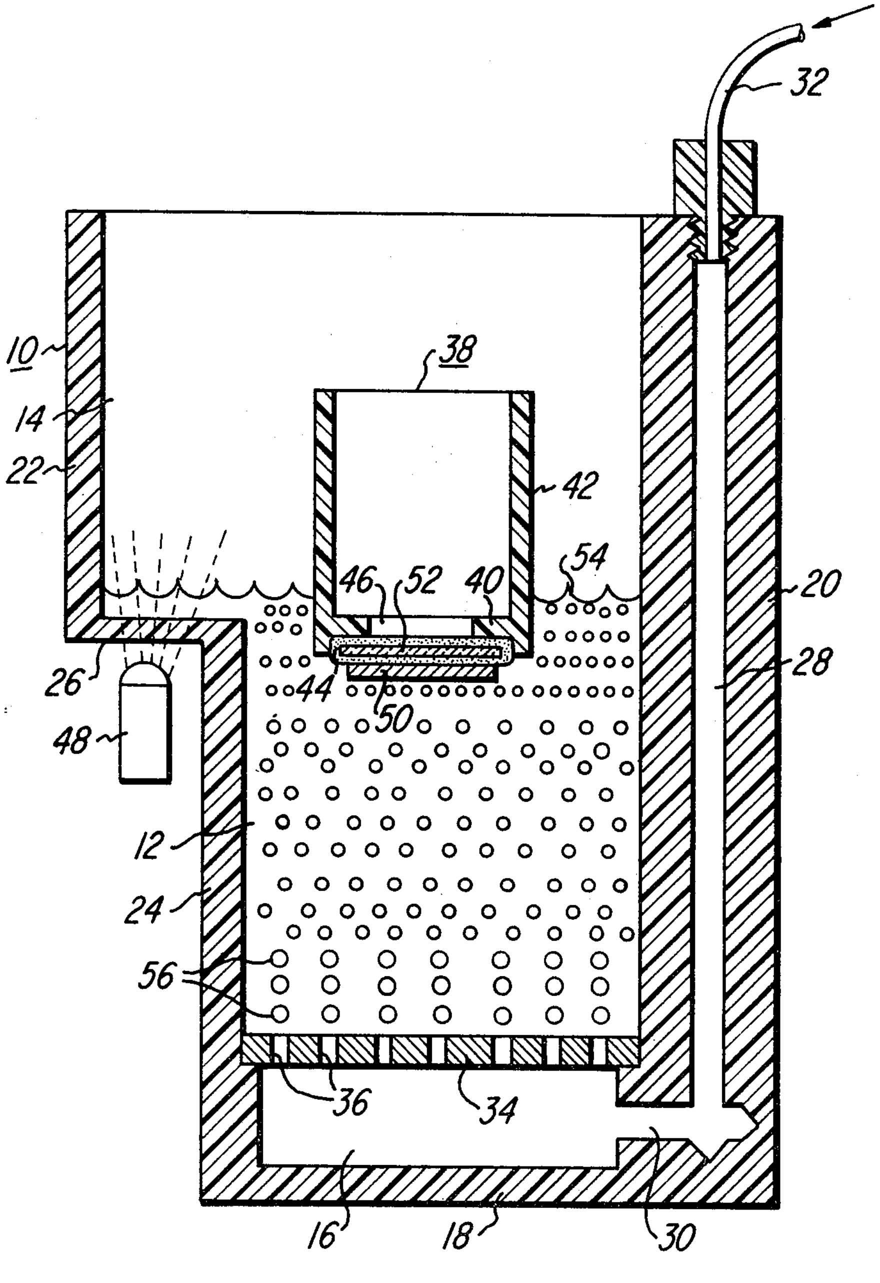
INVENTORS
Arthur I. Stoller &
Stephen T. Opresko
BY
ATTORNEY

Patented July 18, 1972

3,677,848

METHOD AND MATERIAL FOR ETCHING SEMICONDUCTOR BODIES

Arthur Irwin Stoller, North Brunswick, and Stephen Thomas Opresko, Hightstown, N.J., assignor to RCA Corporation Filed July 15, 1970, Ser. No. 55,067
Int. Cl. H01l 7/00
U.S. Cl. 156—17 6 Claims

ABSTRACT OF THE DISCLOSURE

An etchant for uniformly etching bodies of silicon or germanium which provides an etched surface which is free from pits and peaks. The body is etched by immersing a surface of the body in a mixture of hydrofluoric acid, nitric acid, acetic acid and either sodium chlorite or sodium nitrite and bubbling a gas into the etchant so that at least some of the gas bubbles impinge on the surface of the body.

BACKGROUND OF THE INVENTION

The present invention relates to method and material for etching a body of semiconductor material, and more particularly to a method and chemical etchant for uniformly reducing the thickness of a semiconductor body of silicon or germanium and providing a specular surface.

In making various types of semiconductor devices, it is often necessary to start with a relatively thick body or wafer of the semiconductor material and at some step in the operation reduce the thickness of the body to achieve a relatively thin body of uniform thickness. Both mechanical polishing techniques and chemical etching techniques have been used to reduce the thickness of a semiconductor body. It is difficult to achieve this since, as the body is thinned, it becomes more fragile and more susceptible to being broken unless handled with great care. Also, if the surface of the original body is non-planar it is difficult to achieve a thinned body of uniform thickness using the mechanical polishing techniques.

When a semiconductor body is etched in a liquid etchant, small bubbles are formed on the etched surface of the body as a product of the reaction of the etchant on the semiconductor material. These small bubbles cling to the surface of the body and, if not dislodged, can cause the surface to be etched non-uniformily, resulting in a pitted surface. Various methods have been used to dislodge these bubbles, such as etching in a rotating container or ultrasonic baths. However, these methods generally lead to a non-uniform flow pattern of the liquid etchant at the surface of the body. Consequently, some areas of the body surface are etched faster than others resulting in a non-uniform thickness of the body.

Recently there has been developed a method for etching a body of semiconductor material to uniformly reduce the thickness of the body. For this method the body is freely floated in a liquid etchant in a container with only one surface of the body being exposed to the etchant. A gas is bubbled through the etchant from the bottom of the container. The gas bubbles impinge on the surface of the body to dislodge any small bubbles formed on the surface of the body as a reaction product of the etching. The removal of the small reaction bubbles and the random floating of the body in the etchant provides a uniform etching of the body over the entire exposed surface of the body. This method allows for the monitoring of the thickness of the body as the etching progresses by shining a light into the etchant. As the body is thinned, at a particular thickness it becomes transparent allowing more light to be transmitted through the body. Although this method satisfactorily thins the bodies to a uniform thickness, it has been found that when using conventional etchants to carry out this method the resulting etched surface of the body often has irregularities in it, such as pits or peaks, that may render the body unsuitable for a given application. Therefore it is desirable not only to be able to etch the body uniformly but also to end up with a polished surface which is free of defects.

SUMMARY OF THE INVENTION

An etchant for etching bodies of silicon on germanium which is a mixture of hydrofluoric acid, nitric acid, acetic acid and of either sodium chlorite or sodium nitrite. The acids are present in the mixture by volume percent of the total acids in the amount of approximately 9% to 10% hydrofluoric acid, 89% to 91% nitric acid and 0.25% to 0.75% acetic acid. The sodium chlorite or sodium nitrite is present in the amount of 1.5 to 2 grams per 100 cc. of the total acids. A body is etched in the etchant by immersing a surface of the body in the etchant and bubbling a gas, e.g., carbon dioxide, carbon monoxide or nitrogen monoxide, through the etchant so that at least of some of the bubbles impinge on the surface of the body.

BRIEF DESCRIPTION OF DRAWING

The figure of the drawing is a sectional view of an apparatus in which the etchant of the present invention can be used to carry out the method of the present invention.

DETAILED DESCRIPTION

The etcchant of the present invention is a mixture of hydrofluoric acid (48% solution), nitric acid (70% solution), glacial acetic acid and either sodium chlorite or sodium nitrite. The acids are present in the etchant in volume percent of the total acids in the amount of approximately 9% to 10% hydrofluoric acid, 89% to 91% nitric acid and 0.25% to 0.75% acetic. The sodium chlorite or sodium nitrite is present in the etchant in the amount of 1.5 to 2 grams per 100 cc. of the total acids. To make the etchant, the three acids in the appropriate quantities are mixed together and the sodium chlorite or sodium nitrite is then added to the acid mixture. When using sodium chlorite in the etchant, it must be added slowly to the acid mixture because of an initial violent action during the addition. The sodium nitrite, when used, can be added to the acid mixture all at one time.

To etch a body of silicon or germanium with the etch-bubbled into the etchant so that the gas bubbles rise up through the etchant to the surface of the etchant. The body to be etched is immersed in the etchant with the surface of the body to be etched being exposed to the etchant and to the gas bubbles rising upwardly through the etchant. As the exposed surface of the body is being etched by the etchant, the gas bubbles impinge on the surface of the body and dislodge any small bubbles which are formed on the surface of the body as a product of the reaction of the etchant and the material of the body. This removes the reaction bubbles so as to achieve a uniform etching of the surface of the body. The gas used to form the gas bubbles in the etchant can be either carbon dioxide, carbon monoxide, nitrogen, oxygen or nitrogen dioxide, However, it has been found that carbon dioxide, carbon monoxide or nitrogen monoxide are preferable since these gases provided the most blemish free surface. Also, it is preferable to freely float the body in the etchant. The gas bubbles rising up through the etchant will cause the freely floating body to randomly bob about in the etchant which assists in achieving a uniform etching of the body. The etchant composition of the present invention will etch a silicon or germanium body at a rate of 0.00033 inch to .001 inch per minute depending on the amount of hydrofluoric acid in the etchant. The more hydrofluoric acid the faster the etch rate.

Although the etchant of the present invention can be used to etch a body of silicon or germanium in any type of apparatus which will withstand attack from the etchant, the drawing shows one form of an apparatus which is particularly suitable for this purpose. The apparatus comprises a container 10 of a material which will withstand attack from the etchant. Although any suitable material can be used to make the container 10, the fluorocarbon resins, such as polytetrafluorethylene, are particularly acceptable. The container 10 has an etchant containing chamber 12, an upper chamber 14 which is above the etchant chamber 12 and is larger in cross-sectional area than the etchant chamber, and a gas chamber 16 at the bottom 18 of the container and below the etchant chamber 12. One wall 20 of the container 10 is relatively thick and is verticaly straight from the bottom 18 of the container to the top of the container. The upper chamber 14 has a vertical wall 22 which is horizontally spaced from and connected to an adjacent vertical wall 24 of the etchant chamber 12 by a horizontal ledge 26.

A gas passage 28 extends vertically through the straight wall 20 of the container 10 from the top edge of the wall to a horizontally extending passage 30 adjacent the bottom 18 of the container. The passage 30 opens into the gas chamber 16. A gas feed tube 32 is connected to the top end of the same passage 28. A plate 34 of the same material as the container 10 extends and is secured across the bottom of the etchant chamber 12 so as to separate the etchant chamber from the gas chamber 16. The plate 34 has a plurality of small holes 36 therethrough through which gas can pass from the gas chamber to the etchant chamber.

The apparatus includes a float 38 of a material which will withstand attack from the etchant preferably a fluocarbon resin. The float 38 is cup-shaped having a bottom 40 and an outer wall 42. A recess 44 is provided in the outer surface of the bottom 40 and an opening 46 extends through the bottom 40 to the recess 44. The cross-sectional area of the float 38 is smaller than the cross-sectional area of the etchant chamber 12 of the container 10. A light source 48 is mounted adjacent the ledge 26 of the chamber 10 so as to direct its light through the ledge into the upper chamber 14.

In the use of the apparatus to perform the method of the present invention, a body 50 of silicon or germanium is mounted in the recess 44 in the bottom 40 of the float 38 with the body extending across the opening 46. As shown in the drawing, the body 50 is mounted on a plate 52 of a transparent material, such as glass, which is secured within the recess 42. A flow of a gas either carbon dioxide, carbon monoxide, or nitrogen monoxide is provided from the feed tube 32 to the gas chamber 16 through the passage 28 and 30, and the etchant chamber 12 is filled with a suitable liquid etchant 54. Sufficient etchant 54 is provided so that it extends into the upper chamber 14 to a level slightly above the ledge 26. The float 38 is then placed in the etchant 54 with the body 50 being immersed in the etchant.

The float 38 floats in the etchant 54 so as to expose a surface of the body 50 to the etchant. The gas in the gas chamber 16 passes through the openings 36 in the plate 34 and forms individual gas bubbles 56 in the etchant 54 entirely across the etchant chamber 12. The bubbles 56 rise upwardly through the etchant 54 to the top surface of the etchant. The rising bubbles 56 agitate the etchant 54 so as to cause the float 38 to randomly bob about in the etchant. Also, some of the bubbles 56 impinge on the surface of the body 50. The impinging gas bubbles 56 dislodge any small bubbles which are formed on the surface of the semiconductor body 50 as a product of the reaction of the etchant with the semiconductor material of the body so as to remove the reaction bubbles from the surface of the body.

This apparatus has the advantage that it permits monitoring the thickness of the body 50 as it is being etched without removing the body from the etchant. Bodies of such semiconductor material as silicon and germanium become transparent at a particular thickness. For example, silicon becomes transparent at a thickness of 1 mil. Thus, by manually moving the float 38 over the ledge 26 without removing the body 50 from the etchant 54, the light from the light source 48 is directed at the body 50 so that when the body is etched to its particular thickness the body will transmit the light therethrough. By viewing the body 50 through the opening 44 in the bottom 40 of the float 38, an indication of the thickness of the body is provided by the amount of light which can be seen or measured. The etchant composition of the present invention which includes sodium chlorite has a particular advantage in monitoring the thickness of the body in that the light transmitted through the body using this etchant changes color when the body reaches its particular thickness. For example, the etchant of the present invention which includes sodium chlorite is pale green in color. When a silicon body is etched in this etchant composition, when the silicon body reaches a thickness of 0.9 mil the light transmitted through the body is crimson red in color. As the silicon body is etched thinner the transmitted light turns to orange-red at about a thickness of 0.65 mil and then changes to yellow at a thickness of 0.4 mil and under. Thus, by viewing the color changes of the transmitted light this thickness of the body can be monitored, and with some practice it has been found possible to stop the etching reproducibly to a tolerance of about $\pm 0.1$ mil.

EXAMPLE

A silicon wafer 1.4 inches in diameter and 0.020 inch thick was secured to a 1.5 inch diameter glass plate with an essentially pure paraffin wax. The glass plate was placed in the recess 42 of the float 38 and secured therein with the same type of wax. The container 10 was filled with the etchant of the present invention which was a mixture of hydrofluoric acid (48% solution), nitric acid (70% solution), glacial acetic acid and sodium chlorite. The acids were present in the mixture in percent by volume of the total acids in the amount of 9.5% hydrofluoric acid, 90% nitric acid and 0.5% acetic acid. The sodium chlorite was present in the mixture in the amount of 1.4 grams per 100 cc. of the acids. Carbon dioxide was bubbled through the etchant. The float was placed in the etchant with the silicon wafer being exposed to the etchant and the carbon dioxide bubbles. After 10 minutes the wafer was removed from the etchant and washed in distilled water. The etched wafer was found to be 0.012 inch in thickness showing an etching rate of 0.0006 inch per minute. The wafer was found to have been uniformly etched and the etched surface was flat and free of pits and peaks.

What is claimed is:

1. A method of etching a body of silicon or germanium comprising the steps of (a) immersing a surface of the body in a liquid etchant which comprises a mixture of hydrofluoric acid, nitric acid, acetic acid and either sodium chlorite or sodium nitrite with the acids being present in the mixture in volume percent of the total acids in the amount of approximately 9% to 10% of a 48% solution of hydrofluoric acid, 89% to 91% of a 70% solution of nitric acid and 0.25% to 0.75% of glacial acetic acid and the sodium chlorite or sodium nitrite being present in the amount of 1.5 to 2 grams per 100 cc. of the total acids, and (b) bubbling a gas into the etchant so that at least some of the gas bubbles impinge on said surface of the body during the etching thereof.

2. A method in accordance with claim 1 in which the body is freely floated in the etchant with the said surface of the body being exposed to the etchant.

3. A method in accordance with claim 1 in which the gas is selected from the group consisting of carbon monoxide, carbon dioxide and nitrogen monoxide.

4. A method in accordance with claim 1 in which the etchant includes sodium chlorite.

5. An etchant for etching silicon or germanium comprising a mixture of hydrofluoric acid, nitric acid, acetic acid and either sodium chlorite or sodium nitrite with the acids being present in the mixture in volume percent of the total acids in the amount of approximately 9% to 10% of a 48% solution of hydrofluoric acid, 39% to 91% of a 70% solution of nitric acid and 0.25% to 0.75% of glacial acetic acid and the sodium chlorite or sodium nitrite being present in the amount of 1.5 to 2 grams per 100 cc. of the total acids.

6. An etchant in accordance with claim 5 including sodium chlorite.

References Cited

UNITED STATES PATENTS

| | | | |
|---|---|---|---|
| 2,941,875 | 6/1960 | Amaya | 156—17 |
| 3,272,748 | 9/1966 | Szkudlapski | 156—17 X |
| 3,483,049 | 12/1969 | Grubbe | 156—5 |
| 2,847,287 | 8/1958 | Landgren | 156—17 X |
| 2,875,140 | 2/1959 | Sikina | 204—143 |
| 2,983,591 | 5/1961 | Stead | 156—17 X |
| 3,502,519 | 3/1970 | White | 156—5 |

FOREIGN PATENTS

| | | | |
|---|---|---|---|
| 204,787 | 10/1920 | Canada | 156—5 |

ROBERT F. BURNETT, Primary Examiner

R. L. MAY, Assistant Examiner

U.S. Cl. X.R.

252—79.3

UNITED STATES PATENT OFFICE
CERTIFICATE OF CORRECTION

Patent No. 3,677,848 Dated July 18, 1972

Inventor(s) Arthur Irwin Stoller & Stephen Thomas Opreska

It is certified that error appears in the above-identified patent and that said Letters Patent are hereby corrected as shown below:

Column 1, line 47, change "non-uniformily" to --non-uniformly--.

Column 2, line 31, change "etcchant" to --etchant--;

line 47, after "etch--" insert --ant, the etchant is placed in a container and a gas is--.

Column 3, line 18, change "verticaly" to --vertically--.

Signed and sealed this 26th day of December 1972.

(SEAL)
Attest:

EDWARD M.FLETCHER,JR.
Attesting Officer

ROBERT GOTTSCHALK
Commissioner of Patents